United States Patent [19]
Campanile

[11] Patent Number: 5,778,549
[45] Date of Patent: Jul. 14, 1998

[54] CORRECTING MEASUREMENT ERRORS

[75] Inventor: Lucio Flavio Campanile, Brunswick, Germany

[73] Assignee: Deutsche Forschungsanstalt fur Luft-und Raumfahrt e.V., Bonn, Germany

[21] Appl. No.: 715,697

[22] Filed: Sep. 19, 1996

[30] Foreign Application Priority Data

Sep. 19, 1995 [JP] Japan ............... 195 34 641.6

[51] Int. Cl.$^6$ ............... G01B 5/008; G01B 7/008
[52] U.S. Cl. ............... 33/503; 33/702; 33/703; 33/549; 364/571.01; 364/560
[58] Field of Search ............... 33/503, 703, 549, 33/551, 553, 554, 1 M, 559, 561, 702; 364/571.01, 560, 571.02, 571.04

[56] References Cited

U.S. PATENT DOCUMENTS

| | | |
|---|---|---|
| 4,333,238 | 6/1982 | McMurty. |
| 4,782,598 | 11/1988 | Guarini ............... 33/503 |
| 5,579,246 | 11/1996 | Ebersbach et al. ............... 33/503 |

FOREIGN PATENT DOCUMENTS

| | | |
|---|---|---|
| 33 10345 A1 | 9/1984 | Germany. |
| 3801 893 A1 | 2/1989 | Germany. |
| 43 42 312 A1 | 6/1995 | Germany. |
| 43 45 095 C1 | 6/1995 | Germany. |

*Primary Examiner*—Christopher W. Fulton
*Attorney, Agent, or Firm*—Salter & Michaelson

[57] ABSTRACT

A method of correcting measurement errors in a measurement robot resulting from relative movements between an object to be measured and a measurement probe comprises the steps of detecting the accelerations at the probe, detecting the accelerations at or close to the object to be measured, calculating the correction data reproducing the relative movement from the measured accelerations and correcting the measured values recorded by the measurement robot with the correction data. The robot serves for determining shape and/or coordinates of an object to be measured, with a base unit, at least one movable measurement probe arranged on the base unit and a holding device arranged on the base unit for holding the object to be measured, wherein first acceleration are arranged on or close to the measurement probe, and second acceleration pickups are provided on the base unit, and an evaluation device is provided which calculates correction data from the measured data of the first and second acceleration pickups.

15 Claims, 4 Drawing Sheets

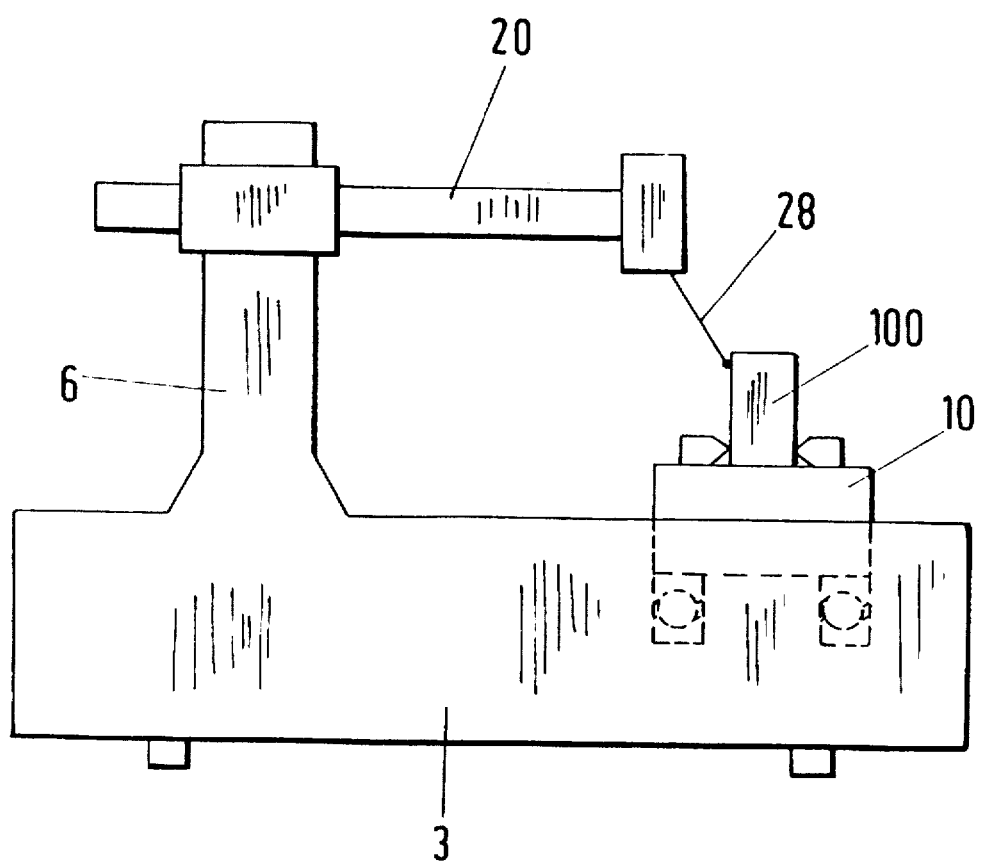

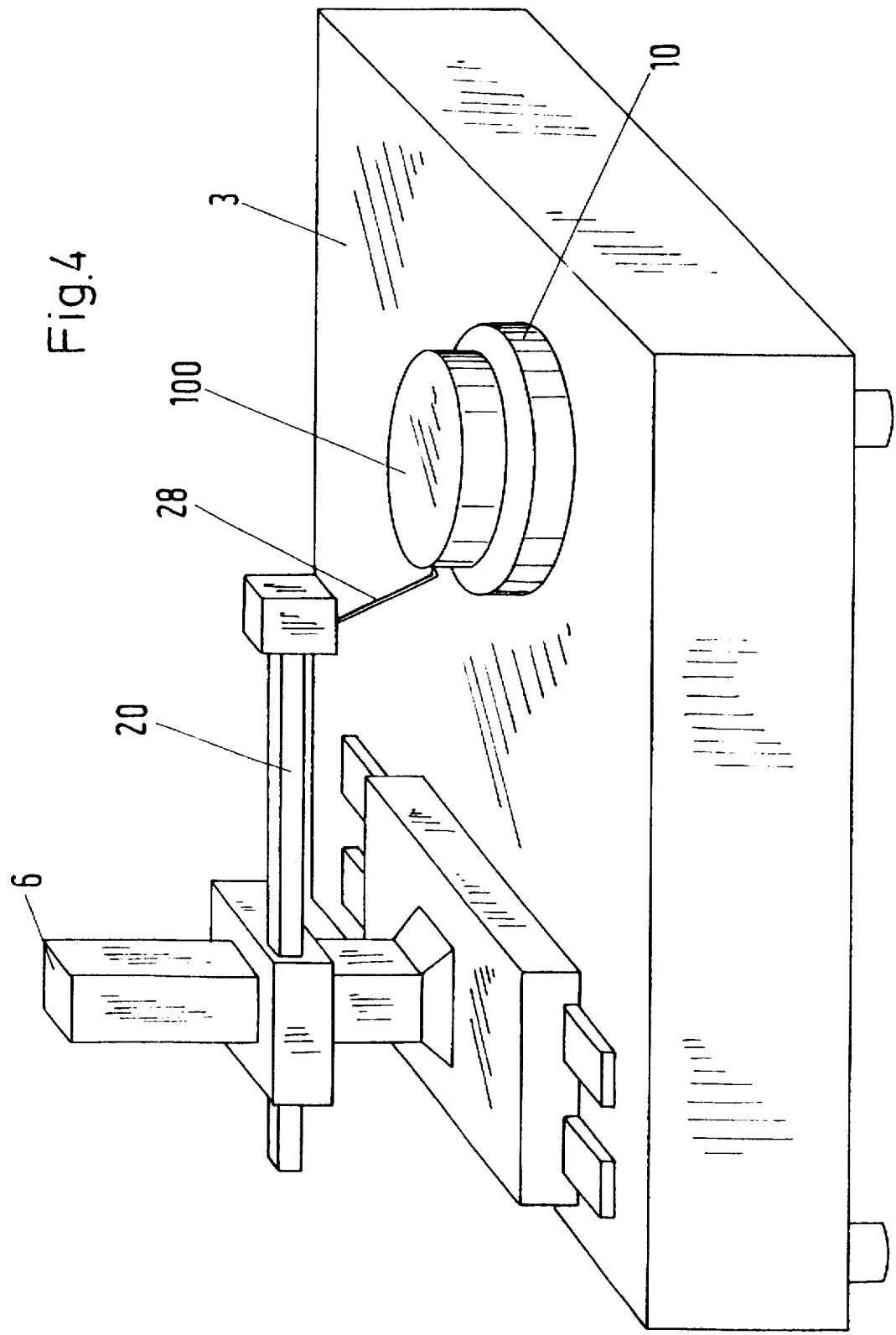

CORRECTING MEASUREMENT ERRORS

BACKGROUND OF THE INVENTION

The invention relates to a method of correcting or equalising measurement errors in a measurement device such as a measurement robot resulting from relative movements between the object to be measured and the measurement probe. The invention also relates to a measurement robot for determining shape and/or coordinates on an object to be measured with a base unit, at least one movable measurement probe arranged on the base unit and a holding device arranged on the base unit for holding the object to be measured, wherein first acceleration pickups are arranged on or close to the measurement probe.

Such measurement devices are known as measurement robots in the manufacturing industry. The purpose of such measurement robots is to detect dimensions, or deviations thereof from a predetermined value, on an object to be measured. The curve of specific profiles on the surface of the test object is thereby determined with a high degree of precision. The measurement machines are connected to a control and evaluator computer. The selected and measured profiles are then evaluated by the computer in order to examine the object to be measured for the prescribed shape, position and surface tolerances.

These measurement robots, which are constructed, for example, in the form of a shape measurement machine or coordinate measurement device, have a base unit with a clamping device, on which the test object is fastened, and a movable measurement probe, to which the path recorder responsible for determining the profile is attached. The mobility of the measurement probe is adapted to the measurement tasks and can permit complete spatial movement around the object to be measured.

However, the clamping device may frequently also be movably arranged on a relatively rotatable and/or linearly displaceable cradle. In this way, the degrees of freedom of motion of the measurement probe may be reduced by one direction. Nevertheless, the entire surface of the object to be measured can be scanned with the object to be measured being displaceable on the clamping cradle relative to the measurement probe. An essential factor is that for the shape measurement, the measurement probe is moved relative to the object to be measured, whereas the path recorder attached to the measurement probe maintains contact with the surface of the object to be measured with its measurement sensing element.

If a further unknown movement arises in addition to this desired and known relative movement, e.g. as a result of vibration stress, an error occurs in the determination of the surface profile on the object to be measured.

Such measurement robots are therefore relatively susceptible to vibration because of their movable measuring arms which project freely into the area. However, since these measurement devices are used in particular in manufacturing plants, vibration stress can scarcely be avoided. A large number of sources causing vibrations are in use in factory workshops, e.g. lathes, drilling machines, CNC work stations, conveyor belts etc. These interference vibrations lead to undesirable relative movements between the measurement probe and object to be measured. This, therefore leads to measurement errors.

Therefore, a highly precise measurement result can only be achieved if the measurement robot has correspondingly rigid components, which results in very high weight. Moreover, materials of high rigidity may be used which are frequently very expensive and difficult to work with. In addition, the setup location must be shielded against vibrations where possible. All these measures are extremely costly.

In addition, an attempt has been made to filter the displayed measured data in order to filter out high-frequency interference effects which presumably come from external interference sources. Cut-off frequencies of 80 Hz to 100 Hz, for example, are selected in this case. The disadvantage here is that inaccuracies determined on the object to be measured are also eliminated in this frequency range. In particular, such a low-pass filtering of the measured data restricts the speed of measurement since the desired measurement signal is also higher frequency as the speed of the relative movement increases.

It is also hardly possible to carry out the measurement multiple times in order to suppress the interference component by averaging, for example, since from the economic viewpoint, the throughput of objects to be measured per unit time should be as high as possible.

A method of correcting measurement errors is known for coordinate measurement devices from German Patent Document 43 42 312 A1. In this method of correcting measurement errors resulting from vibrations, the time curve of the interference vibrations is stored by means of three acceleration sensors arranged on the measuring head of the coordinate measurement device. The measured values of the sensors are compared with stored correction parameters, which describe the natural frequency and the damping of vibrations as well as the amplitude and phase information of the inherent forms of vibration contributing to the interference vibrations. The measurement error of the coordinate measurement device caused by vibration is then calculated at the time of contact from the time curve of the corrected measured values of the sensors.

The disadvantage here is that only theoretical corrections of measurement errors are calculated as errors caused by free vibrations taking into account natural frequencies, inherent forms and damping values. Actual determination of the relative movement between the sensing head and the object to be measured is not possible. With respect to the device, a further sensor may be arranged on the measurement table for consideration of the vibrations of the work piece table and to take into account the correction parameters dependent on the mass of the object to be measured.

A measurement machine for the exact determination of area points is known from German Patent Document 43 45 095 C1 in which a multiple- axle transport system is designed to absorb the transport and weight forces occurring during movement, while a corresponding multiple-axis reference system measures the occurring relative movements free from external force effects. Although this enables the relative movement between the probe and object to be measured to be determined completely spatially, this does not occur with acceleration pickups but with the so-called multiple-axis reference system. This serves to determine the relative movement between the various elements of the transport system by means of path sensors. The information concerning the relative movement between the probe and object to be measured results from the superposition of these different relative movements. The disadvantage here is that this reference system forms an open measurement chain and therefore all the errors occurring during determination of the relative movements of the different link pairs of the reference system are accumulated. Moreover, the measurement device involves high production expenditure and is sensitive during operation.

Furthermore, a program-controlled automatic measurement device is known from German Patent Document 38 01 893 A1 which is equipped with an acceleration sensor attached on the device base so as to be rigid against vibration for the detection of interference vibrations. The accelerations are recorded separately in three coordinates and an output signal representing the amount of the vibration vector is generated by a signal evaluation means, said output signal effecting a temporary stoppage of the measurement device when a given limit value is exceeded.

The disadvantage here is that the accelerations are not detected quantitatively to determine correction values for the measurement, but the measurement cycle is interrupted when a specific limit value for the measured acceleration has been exceeded in order to repeat the recording of measured values. Therefore, this device is only suitable for occasional disturbances. The measurement time is considerably increased in the case of frequent interruptions.

SUMMARY OF THE INVENTION

According to a first aspect, the invention provides a method of correcting measurement errors in measurement values in a measurement robot resulting from relative movement between an object to be measured and a measurement probe, comprising the steps of:

detecting accelerations at said probe, detecting accelerations at or close to said object to be measured, and calculating correction data reproducing said relative movement from said detected accelerations and correcting said measured values recorded by said measurement robot with said correction data.

According to a second aspect, the invention provides a method wherein said correction data reproducing said relative movement are calculated from said detected acceleration values by subtraction and double integration.

Therefore the object of the invention is to provide a measurement method or measurement device, which allows the reliable evaluation of measurement errors generated as a result of external interference effects at low expenditure without thereby corrupting the measurement result.

With respect to the method, this object is achieved by the steps of detecting the accelerations at the probe, detecting the accelerations at or close to the object to be measured, calculating the correction data reproducing the relative movement from the measured accelerations and correcting the measured values recorded by the measurement robot with the correction data.

With respect to the device, this object is achieved in that second acceleration pickups are provided on the base unit, and an evaluation device is provided which calculates correction data from the measured data of the first and second acceleration pickups.

BRIEF DESCRIPTION OF THE DRAWINGS

A preferred embodiment of the present invention will now be described, by way of example, with reference to the accompanying drawings, of which:

FIG. 3 is a schematic side view of an alternative construction of FIG. 1, and

FIG. 4 is a perspective representation of the measurement robot.

DESCRIPTION OF THE PREFERRED EMBODIMENT

Figure 1:
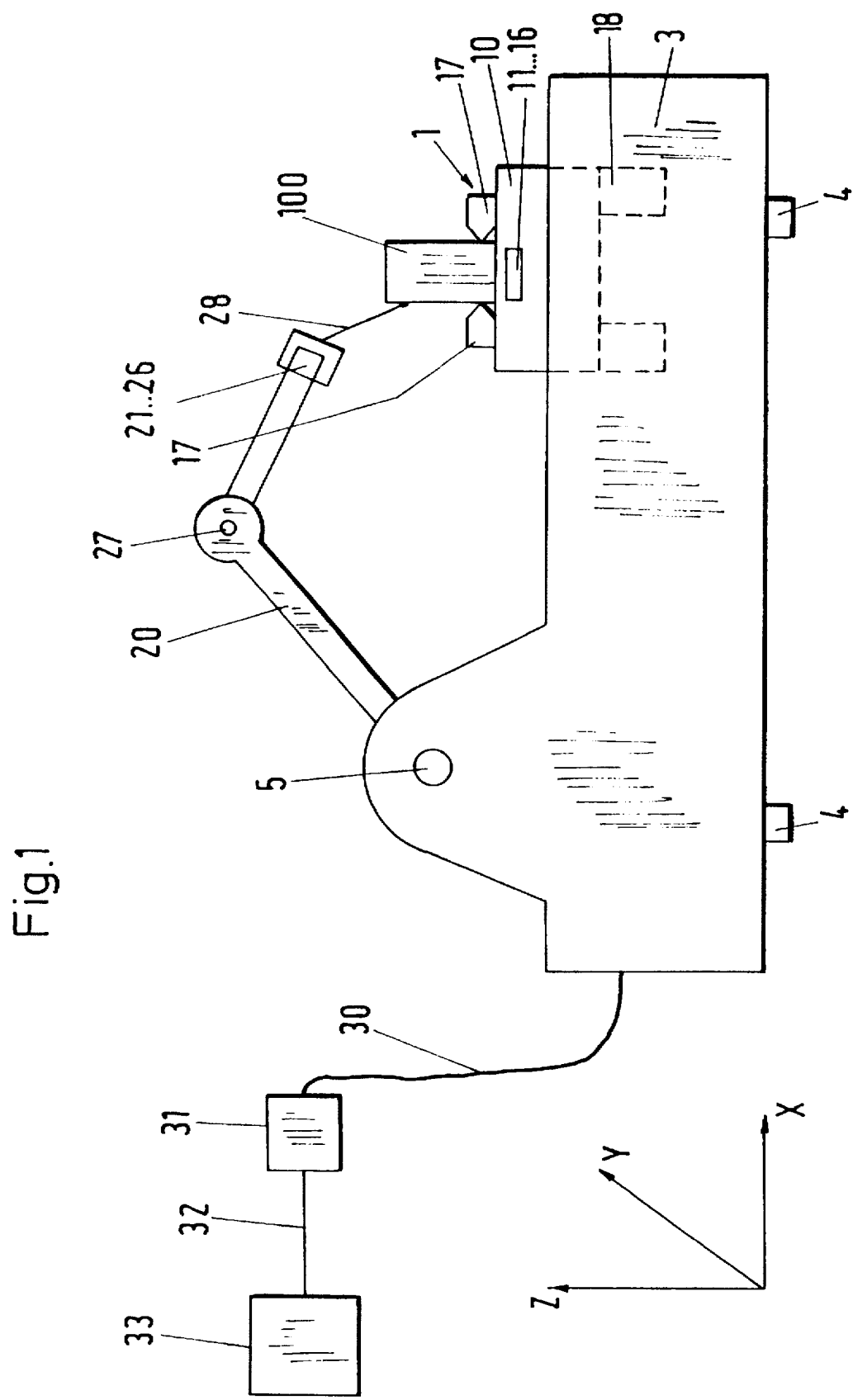
FIG. 1 is a schematic side view of a measurement robot according to the invention.

Basically, according to the invention, the relative movement between the measurement probe and the base unit caused by external interference affects such as shocks and vibrations is determined on the basis of acceleration measurements and a corresponding correction of the measurement results is undertaken. The absolute movement of the measurement site in the area is detected at this measurement site of the accelerations. This applies both to the object to be measured, namely by the acceleration pickup disposed on the base unit of the measurement robot, and to the measurement probe and by the acceleration pickup disposed on the measurement probe.

In the measurement method according to the invention, the accelerations are detected at a point assumed to be only executing the desired scanning movement on the measurement device. The same is carried out in parallel for a point on the base unit assumed to be fixed. From the acceleration values correction values may then be derived computationally via known movement equations without having to define a specific reference point. The calculated correction data are then subtracted from the path measurement data so that a corrected measurement signal is formed. In addition, the intended movements of the measurement device may be taken into account in the calculation of the correction data so that only the undesirable relative movement, namely the interference component, may then be eliminated.

Because of this, the design of the measurement device can be simplified, in particular the material expenditure can be reduced. Moreover, no expensive vibration insulation measures need to be provided. This results in a considerable reduction in costs in production overall. Operation of the measurement device is more economical since it can be set up as near as possible to the manufacturing location of the objects to be tested, e.g. directly adjacent to a CNC centre, without there being a risk of measurement errors as a result of interference vibrations.

Therefore, the measurement device is equipped with first acceleration pickups on or close to the measurement probe. Six first acceleration pickups are provided for the complete detection of all degrees of freedom of motion. Hence, with appropriate alignment of the acceleration pickups, linear accelerations in X, Y, Z direction as well as rotations about the X, Y, Z axis may be detected. This type of acceleration measurement is to be provided in particular for measurement devices with long, multiply displaceable measuring arms. In the case of a construction of the measuring arm stable in a specific spatial direction, individual components of the acceleration measurement may be omitted to simplify the apparatus.

The measurement device is additionally equipped with second acceleration pickups on the base unit. The provision of six acceleration pickups is also preferred here for the complete detection of all degrees of freedom of motion. Hence, with appropriate alignment of the acceleration pickups, linear accelerations in X, Y, Z direction as well as rotations around the X, Y, Z axis, and therefore on the object to be measured firmly connected via the holding device, may be detected. To simplify the measurement device, individual components of the acceleration measurement may be omitted in the case of an appropriately stable construction of the base unit and/or in keeping with interferences not be expected from this spatial direction.

If desired, the provision of a larger number of acceleration pickups may also provide the possibility of an even more precise determination of the relative movement, for instance by arranging additional ones above the respective minimum number. The redundant measured values may be averaged, for example, according to the method of the smallest squares in order to reduce the sensor-dependent measurement errors.

Measurement inaccuracies in the determination of measurement errors resulting from vibration may be taken into account with a calibration process. The calibration should be carried out before each measurement or measurement series. The probe signal is available as reference for calibration, in which case the measurement machine with the object to be measured is configured as for a measurement, and the measurement probe is brought into contact with the surface of the object to be measured, however without the movement axes being actuated. The probe then merely records the movement components resulting from vibration. If the fault signal obtained from the acceleration pickups is provided with corresponding calibration coefficients for evaluation of measurement inaccuracies, then these coefficients may be adapted so that the difference from the correction data calculated as fault signal and the measurement probe signal results in a minimum.

Typical systematic measurement inaccuracies have the following backgrounds:

1. The evaluation of signals from the acceleration pickups is based on a characteristic of the sensors as well as the sensor amplifier and other evaluation electronics which generally differs from the actual characteristic.

Even in the simple case where a constant sensitivity over the entire frequency range of interest (as conversion factor between the signal supplied by the sensor and the corresponding acceleration) can be assumed, the value of the sensitivity can change under the effect of external influences. An additional factor is that the actual behaviour is generally dependent on frequency. Moreover, there is generally a phase shift between acceleration and sensor signal which is not taken into account by the real conversion factor.

2. Calculation of those components relevant for the measurement error of the relative movement between the probe and object to be measured on the basis of the acceleration signals is based on exact knowledge of the position of the points at which the acceleration is measured, as well as of the contact point of the measurement probe. However, in practice these points can only be determined within specific tolerances.

3. The acceleration sensors do not measure in an exact direction-selective manner. There is a certain sensitivity in relation to components of the acceleration which are normal to the nominal measurement direction of the sensor. This sensitivity can be increased, inter alia, by inaccuracies in the alignment of the sensor.

For equalisation of the different effects, calibration processes of different complexity may be used. In the simplest case, the calibration coefficients are constant and real (simple conversion factors without phase shift). More extensive procedures are also possible, in which the coefficients, for example, have one or more of the following characteristics:

they are complex (a phase shift is also taken into account);
they are frequency-dependent;
they are dependent on the position of the measurement probe relative to the object to be measured.

The correction may be conducted both in digital and in analog form. In the first case, the digitised pickup signals are converted, in the second the signals are influenced by an adjustable filter. A combination of both is also possible.

As an alternative or as an addition to the above-described calibration, the measurement machine may be equipped with calibration devices which serve to reduce certain systematic inaccuracies in a constructive manner. A device, which is intended in particular for inaccuracies of the type described in points 2 and 3 above, comprises a special fastening of the sensors in adjustable holding elements to enable fine adjustment of the position and/or alignment of the sensors. In this case, the probe signal may be used as reference for the fine adjustment.

The measured data are advantageously fed via an analog/digital converter to an evaluator computer which converts the measured accelerations into corresponding correction data using an evaluation program.

Referring now to the drawings, a measurement robot constructed as a shape measurement machine is shown schematically in side view in FIG. 1. The measurement robot serves to detect shape, position and surface tolerances on an object 100 to be measured.

The measurement device has an essentially parallelopipedal base unit 3, which may be erected on feet 4 on a level support or foundation. A displacement table in the form of a displacement cradle 10, on which a clamping device 1 is provided to hold the object to be measured, is arranged on the base unit 3. The clamping device 1 has two clamping jaws 17 arranged opposite one another which may be linearly displaced in opposite directions to one another to enable clamping of an object 100 to be measured arranged between them.

The displacement cradle 10 is mounted in the base unit 3 on two linear pinion gears 18, 18 so that the cradle 10 may be displaced linearly in a horizontal direction with the clamping device 1. In the example shown in FIG. 1, the linear pinion gears 18 are arranged perpendicular to the plane of the drawing in Y-direction. As a result, the object 100 to be measured held in the clamping device 1 may be displaced linearly in Y-direction.

A measuring arm base 5, on which a measuring arm 20 is attached so as to swivel, is provided on the opposition top side of the housing 3 of the measurement device. The measuring arm 20 is preferably divided into several sections with said sections being capable of swivelling relative to one another. In the example shown in FIG. 1, the measuring arm 20 is constructed in two parts with the two sections of the measuring arm 20 being connected via a joint 27.

A measurement probe 2 is provided on the end of the measuring arm 20 facing away from the base unit 3. The measurement probe 2 has a measurement sensing element 28 which scans the object 100 to be measured along predetermined lines. Corresponding path recorders, which convert the deflections of the measurement sensing element 28 precisely into measurement values, are provided on the measurement probe 2. In addition, six first acceleration pickups 21, 22, 23, 24, 25, 26 are provided on the measurement probe 2 to record the accelerations acting on the head of the measuring arm 20.

Three acceleration pickups 21, 22, 23 are arranged in three spatial directions located perpendicular to one another for the measurement of linear accelerations. In addition, three acceleration pickups 24, 25, 26 are provided to detect rotational accelerations around the three spatial axes together with pickups 21, 22, 23. All six degrees of freedom of motion of the head of the measuring arm may be determined with these acceleration pickups 21, 22, 23, 24, 25, 25.

For additional detection of the accelerations acting on the measuring arm, second acceleration pickups 11, 12, 13, 14, 15, 16 are provided on the displacement cradle 10 or base unit 3 to detect the movements of the base unit 3 and also of the displacement cradle 10 with the clamping device 1, and therefore with the object 100 to be measured.

To simplify evaluation of the measurements, it is possible under certain circumstances to dispense with detection of acceleration values in all six degrees of freedom of motion. In the example shown in FIG. 1, all the measurements of the probe take place in the X Y plane, and therefore movements in the Y-direction are of less importance than those in the X- and Z-direction. Therefore, it would be possible to dispense with the acceleration pickup in Y-direction in this case.

Figure 2:
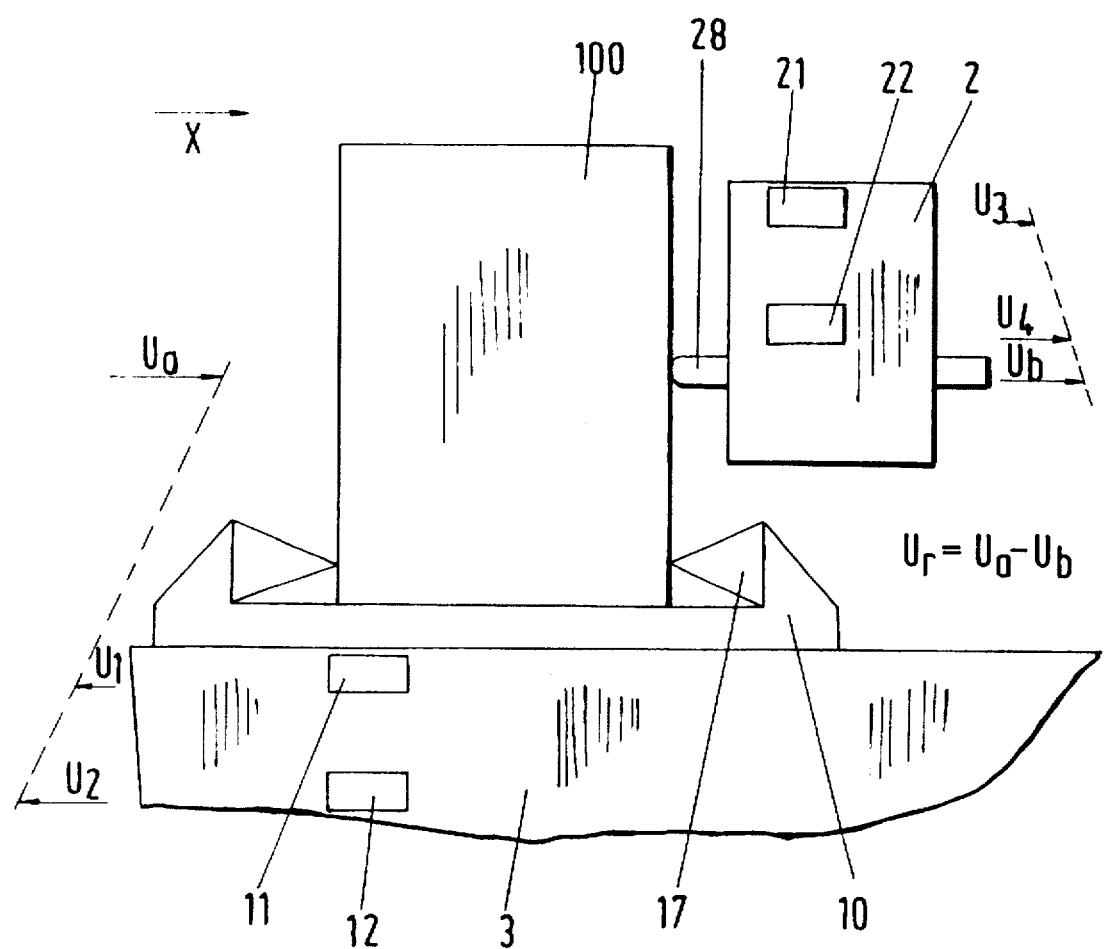
FIG. 2 is a schematic view of the arrangement of the acceleration pickups on a measurement robot according to the invention.

The arrangement of the acceleration pickups on the measurement robot is shown schematically in FIG. 2. For simplification, the arrangement is restricted to the detection of acceleration in one spatial direction and around one rotational axis.

The measurement unit 3 of the measurement robot bears a displacement cradle or turntable 10 which has a clamping device 1. The object 100 to be measured is clamped in clamping jaws 17 in the clamping device 1. The connection between the base unit 3 and the object 100 to be measured is to be regarded as rigid because of the solid construction and the fixed clamping arrangement in the clamping device 1.

The measurement probe 2 fastened to swivel on a measuring arm (not shown) has a path recorder, which records the movements of the measurement sensing element 28 disposed in the measurement probe 2. The measurement sensing element 28 scans the object 100 to be measured with its tip.

A pair of acceleration pickups 11, 12 and 21, 22 is respectively provided on both the base unit 3 and the measurement probe 2. The acceleration pickups 11, 12 and 21, 22, which are arranged parallel to one another in X-direction in the plane of the drawing, detect accelerations in X-direction. Because two acceleration pickups are arranged parallel and at a distance from one another on a base, it is additionally possible to detect rotational movements around the Y-axis arranged orthogonally to the plane of the drawing on the basis of differences in the measured amount of acceleration.

For correction of the measured value detected by the measurement sensing element 28 at the contact point on the object 100 to be measured, the undesirable relative movement between the object 100 to be measured and the measurement probe 2 must be determined. The relative movement between these two objects is determined from the measured accelerations, only in X-direction in the simplified example here, by subtraction and integration.

It must be noted here that no constant or linear components in the movement are to be expected in the case of vibrations, and therefore no uncertainty in integration occurs. It is therefore possible to calculate the amounts of relative movement from the detected acceleration values and to subtract these as correction data from the path constituents recorded at the measurement probe 2. The measurement result is thus rendered free of interference on the basis of relative movements between measurement probes 2 and the object 100 to be measured.

It would now be sufficient in itself to provide an acceleration pickup on the object 100 to be measured and on the measurement probe 2, from the measurements of which the difference is to be formed. Accelerations which both elements are equally subject to are obviously inconsequential for the result—a path or distance measurement.

As shown schematically in FIG. 2, the amount of relative movement at the contact point may be determined even more precisely from the detection of accelerations at two respective acceleration pickups 11, 12 and 21, 22 arranged parallel and at a distance from one another. A diagrammatic view is shown on the left side of FIG. 2 for the relative movement from accelerations acting on the base unit. The absolute movement $u_a$ of the base unit is to be determined at the contact point from the movement components $u_1$ and $u_2$. This is likewise to be calculated for the absolute amounts of movement $u_b$ from the acceleration pickups on the measurement probe 2, as shown on the right side of FIG. 2. Overall, the following applies for the relative movement:

$$u_r = u_a - u_b.$$

Alternatively or additionally, the displacement cradle 10 shown in FIG. 1 may also be rotatably mounted. As a result, rotationally symmetrically constructed objects 100 to be measured may be advantageously detected by the measurement probe 2. The displacement cradle 10 constructed as a turntable is rotatable around the Z-axis in this case. The measuring arm 20 divided into two sections by means of joint 27 is constructed to swivel both at the measuring arm base 5 and also at the joint 27. Corresponding drive elements (not shown) for the swivelling movement of the measuring arm 20 are provided in the base unit 3 on the measuring arm base 5.

The measurement output unit of the path recorder arranged in the measurement probe 2 as well as the measurement output units of acceleration pickups 11 to 16 and 21 to 26 are connected to an analog/digital converter 31 by means of active lines 30. The digital measurement output unit is connected to an evaluator computer 33 via a digital data line 32.

A possible method of operation of the device according to the invention is described below.

An object 100 to be checked for specific dimensional accuracy is placed on the displacement cradle and/or turntable 10 and fastened to the displacement cradle 10 by the clamping device 1. The measuring arm 20 with its measurement sensing element 28 arranged on the measurement probe 2 is then swivelled onto the object 100 to be measured. In the case of an elongated object 100 to be measured, the surface of the object 100 to be measured is scanned in a line formation by operating the linear pinion gears 18, i.e. in a movement oriented along the Y-axis. Scanning of a line is often sufficient for the measurement, since only the adherence to predetermined tolerances must be monitored. However, it is also possible for a complete measurement of the surface to proceed as follows: during every movement back and forth of the object 100 to be measured fastened on the displacement cradle 10, the measuring arm 20 is swivelled by a small predetermined amount so that the measurement sensing element 28 of the measurement probe 2 scans a new surface line.

The displacement table 10 may additionally be constructed to rotate, for example, so that the measuring arm 20 may also measure the rear side of the object 100 to be measured without difficulty. Rotationally symmetric objects 100 to be measured may be placed on a turntable and moved at an adjustable rotational speed. In this case, the measurement sensing element 28 of the measurement probe 2 scans the surface of the rotationally symmetric object 100 to be measured, for example, along a helix. Both the rotational speed and the line spacing are pre-selected depending on the requirement for measurement accuracy. The measurement robot thus scans the entire surface of the object 100 to be measured with its measurement probe 2 in order to determine deviations in tolerances of the object to be measured from desired values. In the simpler method, which is substantially more widely used, only one or two ring-shaped lines are scanned.

The accelerations at the end of the measuring arm 20 facing away from the base unit 3 are measured at the measurement probe 2 with the acceleration pickups 21, 22, 23, 24, 25, 26. The analog accelerations measured values are passed to the analog/digital converter 31 via active lines 30 and are there converted into digital signals. The digital data are then passed to the evaluator computer 33 via the data line 32. In the evaluator computer 33 the movements of the measurement probe 2 are determined from the acceleration data according to an evaluation program. Swivelling movements of the measuring arm 20 are additionally indicated to the evaluator computer 33.

The acceleration pickups 11, 12, 13, 14, 15, 16 attached to the base unit 3 or to the displacement cradle 10 determine the absolute movements of the object 100 to be measured. These serve as reference for the absolute movements detected with the first acceleration pickups 21, 22, 23, 24, 25, 26 and thus determine the relative movements to be detected. Since the base unit 3 or the displacement cradle 10 forms a very rigid connection via the clamping device 1 with the object 100 to be measured, the detection of the accelerations at the base unit 3 or at the displacement cradle 10 should be equated with a detection at the object 100 to be measured itself.

Another example is shown in side and perspective view in FIG. 3 and FIG. 4. The measurement robot measures the circular shape of a cylinder there as object 100 to be measured.

A measuring arm 20, which may be run up and down a column 6 and may be additionally run perpendicular to the column 6, i.e. in horizontal direction, is provided here on the likewise parallelopipedal base unit 3. Its position may be defined most precisely. A measurement sensing element 28 in turn projects from its end. This scans the surface of the object 100 to be measured rotating at defined speed on the turntable 10.

The accuracy of the speed of the turntable 10 influences the correctness of the surface measurement to a far lesser degree than any deviations perpendicular to the rotational axis. The acceleration pickups can therefore be expediently used so that they detect accelerations of the turntable 10 or its positioning perpendicular to the axis. However, detection of further acceleration components would also be possible.

From the measured acceleration data, depending on the example for up to 2 * 6 components, the evaluator computer 33 can determine the unwanted relative movements of the measurement probe 2 to the object 100 to be measured occurring because of undesirable vibrations and other interference effects. The correction data thus calculated are then subtracted from the measured data of the measurement probe 2. The measurement errors occurring as a result of undesirable movements of the measurement probe 2 relative to the object 100 to be measured are thus corrected.

To reduce the evaluation expenditure, only the acceleration components perpendicular to the direction of movement of the displacement cradle 10, in x-direction, for example, in the example shown in FIG. 1, are taken into account. Consequently, only one acceleration pickup 11 is then provided on the displacement cradle 10 and its measurement signal is likewise transmitted via active lines to the analog/digital converter 31 and via data line 32 to the evaluator computer 33. Where necessary in special cases, desired linear displacement movements of the displacement cradle 10 are indicated to the evaluator computer 33 through the linear pinion gears 18 so that these intended movements are not allowed to pass into the correction data calculation.

A calculation method of determining the movement components relevant to the measurement error is described below.

This procedure applies on the assumption that the vibration-induced microscopic field of movement of the probe can be well approached with a rigid body movement, at least in the region in which the sensors are located. The same applies to the base unit.

With reference to a selected axis system, the rigid body movement of the probe can be defined by six parameters:

$$s = \begin{bmatrix} u \\ v \\ w \\ \theta \\ \phi \\ \psi \end{bmatrix}$$

In this case, u, v, w represent three translations along the x, y and z axes, and $\alpha$, $\phi$, $\psi$ respectively are three rotations around the axes. For the displacement of the general point of coordinates x, y, z into the direction defined by direction cosines $\alpha$, $\beta$, $\gamma$ the following applies $$u(x,y,z,\alpha,\beta,\gamma) = U s$$

wherein the following applies for the conversion matrix $$U(x,y,z,\alpha,\beta,\gamma) = |\alpha, \beta, \gamma, (-\beta z + \gamma y), (\alpha z - \gamma x), (-\alpha y + \beta x)|$$

Where the measurement probe is equipped with n acceleration sensors (bi- or triaxial sensors are taken into consideration here as 2 or 3 separate sensors). According to $$x_1, x_2, \ldots, x_n; y_1, y_2, \ldots y_n; z_1, z_2, \ldots z_n$$

the coordinates of the points at which the accelerations are measured would be calculated on the basis of a specific axis system. The corresponding measurement directions would be defined by the direction cosines $$\alpha_1, \alpha_2, \ldots \alpha_n; \beta_1, \beta_2, \ldots, \beta_n; \gamma_1, \gamma_2, \ldots, \gamma_n$$

Hence, there are n U-matrices which can be collected in rows in an n*6 matrix:

$$T = \begin{bmatrix} U(x_1, y_1, z_1, \alpha_1, \beta_1, \gamma_1) \\ U(x_2, y_2, z_2, \alpha_2, \beta_2, \gamma_2) \\ \cdots \\ \cdots \\ U(x_m, y_m, z_m, \alpha_m, \beta_m, \gamma_m) \end{bmatrix}$$

If the acceleration signals are now collected in vector b, as follows:

$$b(t) = \begin{bmatrix} b_1(t) \\ b_2(t) \\ \cdots \\ \cdots \\ b_n(t) \end{bmatrix}$$

then b=Ts.

If n=6, this may be written as follows:

$$s = T^{-1} b$$

The inversion of the transformation matrix T and thus the calculation of the rigid body movement is only possible, if det (T)≠0 this means, if the acceleration pickups deliver independent signals.

If more than six independent sensors are provided, a redundancy results which may be utilised to reduce the effects of measurement inaccuracies. The rigid body movement is then calculated as the result of an optimisation process, e.g. with the method of the smallest squares:

$$s=(T^T T)^{-1} T^T b.$$

The same procedure can be used for determination of the rigid body movement of the base unit as a function of the accelerations measured on the base body. Therefore, two vectors $s_T$ and $s_G$ are determined respectively for the probe and for the base unit.

If now $x_m$, $y_m$, $z_m$ are the coordinates of the contact point and $\alpha_m$, $\beta_m$, $\gamma_m$ are the direction cosines of the probe measurement device, then the components of the relative movement between the probe and object to be measured which are relevant to the probe signal are calculated as follows:

$$u=U(x_m,y_m,z_m,\alpha_m,\beta_m,\gamma_m)(s_G-s_1).$$

After double integration, a signal proportional to the displacement results from the acceleration.

Depending on the application, a simplified procedure, in which the movement field is described with less than six coordinates, can be derived from this general procedure. If, for example, the measurement probe is only in the position to measure in a specific plane and the accelerations are measured in the same plane, then three rigid body coordinates (two translations and one rotation) are sufficient to determine the movement field.

Externally active vibrations and interference effects are covered in the result with the measurement robot according to the invention so that the measurement errors occurring as a result of these interference effects can be corrected. The measurement robot thus determines the curve of predetermined profile lines on the surface of an object to be measured with high precision. The swivelling movements of the measurement probe as well as the linear and/or rotational movement of the displacement cradle are preferably carried out according to a predetermined course of movement under the control of the evaluator computer.

It will be understood that the above description of the present invention is susceptible to various modifications, changes and adaptations.

LIST OF REFERENCE NUMBERS

1 Holding device, clamping device
2 Measurement probe
3 Base unit
4 Foot
5 Measuring arm base
6 Column
10 Displacement table in the form of a displacement cradle and/or turntable
11 Acceleration pickup
12 Acceleration pickup
13 Acceleration pickup
14 Acceleration pickup
15 Acceleration pickup
16 Acceleration pickup
17 Clamping jaw
18 Linear pinion gear
20 Measuring arm
21 Acceleration pickup
22 Acceleration pickup
23 Acceleration pickup
24 Acceleration pickup
25 Acceleration pickup
26 Acceleration pickup
27 Joint
28 Measurement sensing element
30 Active line
31 A/D converter
32 Digital data line
33 Evaluator computer
100 Object to be measured

What is claimed is:

1. A method of correcting measurement errors in measurement values in a measurement robot resulting from relative movement between an object to be measured and a measurement probe, comprising the steps of:
   detecting accelerations at said probe,
   detecting accelerations at or close to said object to be measured, and
   calculating correction data reproducing said relative movement from said detected accelerations and correcting said measured values recorded by said measurement robot with said correction data.

2. A method according to claim 1, wherein said correction data reproducing said relative movement are calculated from said detected acceleration values by subtraction and double integration.

3. A method according to claim 1, wherein accelerations caused as a result of intended movements are not included in the calculation of the correction data.

4. A method according to claim 1, wherein accelerations in space are completely detected in three translational and three rotational directions of movement.

5. A method according to claim 1, wherein desired acceleration components are detected with a redundant number of acceleration pickups and the measured values are averaged.

6. A method according to claim 1, wherein prior to measurement, a calibration process is carried out, in which
   said measurement probe is brought into contact with a surface of said object to be measured,
   no measurement movement is carried out,
   correction data are calculated,
   said calculated corrected data are compared with said measurement probe signal, and
   calibration coefficients are calculated therefrom.

7. A measurement robot for determining shape and/or coordinates on an object to be measured, with a base unit, at least one movable measurement probe arranged on said base unit and a holding device arranged on the base unit for holding said object to be measured, wherein first acceleration pickups are arranged on or closed to said measurement probe, wherein second acceleration pickups are provided on said base unit, and an evaluation device is provided, said evaluation device calculating correction data from measured data of said first and second acceleration pickups.

8. A measurement robot according to claim 7, wherein at least six first acceleration pickups are provided, said first acceleration pickups detecting the three spatial directions as well as the three possible rotational directions.

9. A Measurement robot according to claim 8, wherein at least six second acceleration pickups are provided, said six second acceleration pickups detecting the three spatial directions as well as the three possible rotational directions.

10. A Measurement robot according to claim 7, wherein at least six second acceleration pickups are provided, said six second acceleration pickups detecting the three spatial directions as well as the three possible rotational directions.

11. A measurement robot according to claim 7, wherein said second acceleration pickups are arranged on said base unit close to the holding device.

12. A measurement robot according to claim 7, wherein each said acceleration pickup is arranged in a holding means, and wherein said holding means can be subsequently adjusted in position and/or alignment.

13. A measurement robot according to claim 7, wherein said evaluation device has an analog/digital converter and an evaluator computer, wherein said analog/digital converter digitises the measured data of said acceleration pickups and passes them on to said evaluator computer.

14. A measurement robot according to claim 7 wherein a clamping device with clamping jaws is provided as holding means.

15. A measurement robot according to claim 14, wherein said clamping device is arranged on a displacement table, said displacement table is relatively rotatable and/or linearly displaceable.

* * * * *